United States Patent
Aizono et al.

(10) Patent No.: US 6,665,717 B1
(45) Date of Patent: Dec. 16, 2003

(54) DISTRIBUTED PROCESSING SYSTEM AND COOPERATING METHOD

(75) Inventors: Takeiki Aizono, Kawasaki (JP); Nobuyoshi Ando, Sagamihara (JP); Katsumi Kawano, Kawasaki (JP); Hiroshi Wataya, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/388,487

(22) Filed: Sep. 2, 1999

(30) Foreign Application Priority Data

Sep. 2, 1998 (JP) .......................................... 10-248456

(51) Int. Cl.⁷ .......................................... G06F 15/173
(52) U.S. Cl. ........................ 709/224; 709/201; 709/213; 709/221; 709/223; 370/259; 370/338; 714/23; 714/25
(58) Field of Search ................................. 709/205, 201, 709/213, 223, 224, 245, 221; 710/104; 713/1; 340/505, 855.5; 370/338, 259, 354, 465, 474; 714/25–31; 455/436

(56) References Cited

U.S. PATENT DOCUMENTS

| | | | | |
|---|---|---|---|---|
| 6,021,493 A | * | 2/2000 | Cromer et al. ............... | 340/505 |
| 6,108,699 A | * | 8/2000 | Moiin ......................... | 709/201 |
| 6,115,738 A | * | 9/2000 | Yamaguchi et al. ........ | 709/213 |
| 6,119,186 A | * | 9/2000 | Watts et al. ................ | 710/104 |
| 6,130,892 A | * | 10/2000 | Short et al. ................ | 370/338 |
| 6,172,990 B1 | * | 1/2001 | Deb et al. ................... | 370/474 |
| 6,205,126 B1 | * | 3/2001 | Moon ......................... | 370/259 |
| 6,240,511 B1 | * | 5/2001 | Blumenau et al. ............. | 713/1 |
| 6,243,039 B1 | * | 6/2001 | Elliot ..................... | 342/357.06 |
| 6,272,545 B1 | * | 8/2001 | Flanagin et al. ............ | 709/201 |
| 6,327,677 B1 | * | 12/2001 | Garg et al. ................. | 709/224 |
| 6,412,025 B1 | * | 6/2002 | Cheston et al. .......... | 340/855.5 |
| 6,442,616 B1 | * | 8/2002 | Inoue et al. ................ | 709/245 |
| 6,501,767 B1 | * | 12/2002 | Inoue et al. ................ | 370/465 |
| 6,510,153 B1 | * | 1/2003 | Inoue et al. ................ | 370/354 |
| 6,522,880 B1 | * | 2/2003 | Verma et al. ............... | 455/436 |

FOREIGN PATENT DOCUMENTS

| | | |
|---|---|---|
| JP | 5347626 | 12/1993 |
| JP | 9212209 | 8/1997 |

OTHER PUBLICATIONS

Translation of Foreign Office Action for Korean Application Ser. No. 10–1999–0036437, "Distributed Processing System and Its Cooperating Method". pp. 1–3, Apr. 2001.

\* cited by examiner

*Primary Examiner*—Hosain T. Alam
*Assistant Examiner*—Thu Ha Nguyen
(74) *Attorney, Agent, or Firm*—Antonelli, Terry, Stout & Kraus, LLP

(57) ABSTRACT

In a distributed processing system including a plurality of intelligent devices such as an optical sensor and a processing machine connected via a network to each other, when a first optical sensor is moved from a first section to a second section, if an identifier indicative of the second section is set, then the first optical sensor transmits a retrieve message containing this identifier via the network so as to seek a second optical sensor which is set to the same second section. Then, the first optical sensor acquires a setting parameter from the second optical sensor, and executes an operation in cooperation with the second optical sensor set in the same second section. As a result, in such a distributed processing system including a plurality of computers (intelligent devices) whose processing contents are different from each other, depending upon setting places thereof, workloads for changing the setting values of these computers can be reduced.

4 Claims, 15 Drawing Sheets

FIG.3A

| | POSITION NAME (303) | POSITION ID (304) | 300 |
|---|---|---|---|
| PAST POSITION (301) | CONVEYER A SECTION | 1 |
| PRESENT POSITION (302) | CONVEYER D SECTION | 4 |

POSITIONAL INFORMATION MANAGEMENT TABLE

FIG.3B

| | | NAME (353) | ID NALUE (354) | 350 |
|---|---|---|---|---|
| CONTROL DEVICE SORT (351) | | OPTICAL SENSOR | 1 |
| PARAMETER (352) | | REACTION DISTANCE | 50 |
| | | CHECK CONDITION | 1 |

CONTROL DEVICE MANAGEMENT TABLE

| CONNECT PORT NUMBER 1401 | POSITION ID 1402 |
|---|---|
| 1 | 1 |
| 2 | 1 |
| 3 | 2 |
| 4 | 3 |
| 5 | 2 |
| 6 | 4 |
| 7 | 5 |
| 8 | 1 |

1400

| MEMORY AREA NUMBER | CONTENT CODE |
|---|---|
| 1 | C C 1 |
| 2 | — |
| 3 | C C 2 |
| 4 | C C 3 |
| 5 | — |
| 6 | C C 4 |
| 7 | C C 5 |
| 8 | — |

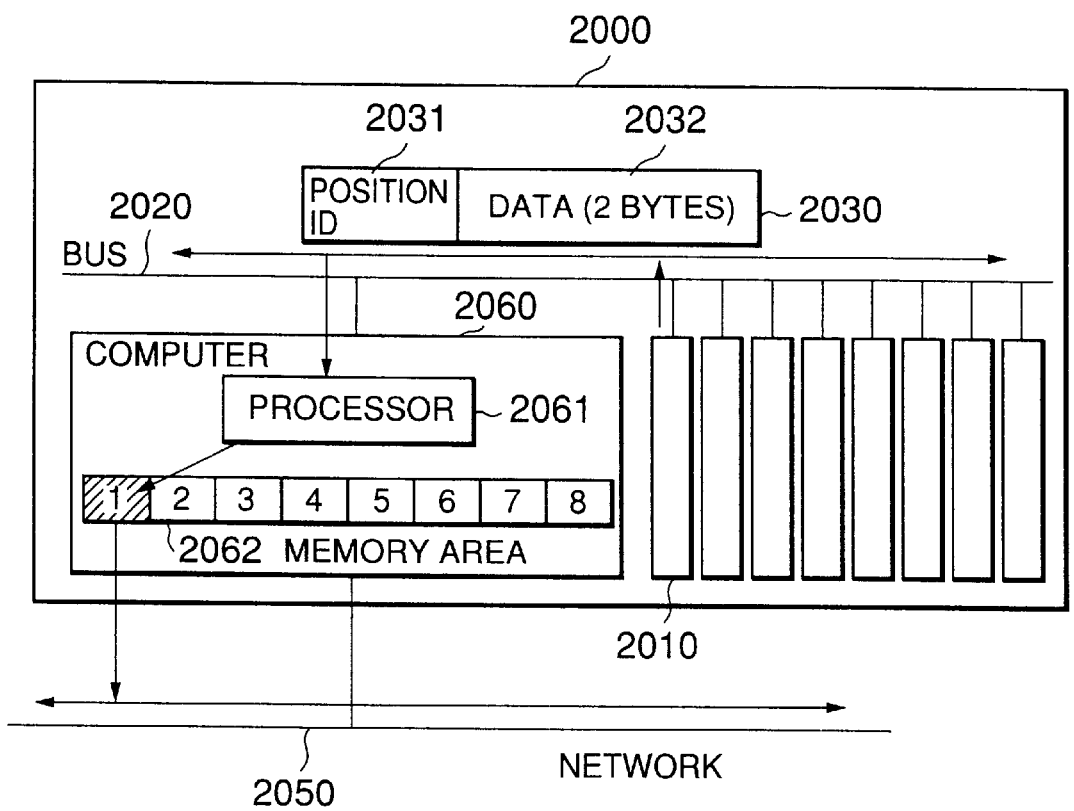

DISTRIBUTED PROCESSING SYSTEM AND COOPERATING METHOD

BACKGROUND OF THE INVENTION

The present invention generally relates a distributed processing system for executing a series of processing operation by using a plurality of computers. More specifically, the present invention is directed to such a distributed processing system that processing operations executed by computers are different from each other, depending upon setting positions of these computers.

Generally speaking, in a distributed processing system for distributing a series of processing operations to be executed by a plurality of computers connected to a network so as to execute these distributed processing operations by these computers, programs executed in the respective computers cooperate with each other, depending upon conditions within this distributed processing system, to perform the processing operations. The above-described conventional method for performing a distributed processing operation by computers is disclosed in, for example, Japanese Patent Laid-open No. 5-347626 (Japanese Patent Publication No. 7-22290). Also, another conventional method for multiplexing the computers so as to achieve high reliability in such a distributed processing system is described in, for instance, Japanese Patent Laid-open No. 9-212209.

On the other hand, in control systems which control controlling subjects, for instance, in a control system for controlling a production line in a production field, the controlling subjects and contents of the processing varies, depending upon places where control apparatuses are installed.

As a result, when the conventional distributed processing system is applied to the above-described control system, since the respective computers employed in the conventional distributed processing system do not manage the processing contents in connection with the setting places of these computers, in such a case that a setting place of one computer is changed and a controlling subject of this computer is changed, a program and a setting value are required to be changed by a programmer and a worker in a production field to change the processing content of the computer.

Recently, since computer-down-sizing trends are specifically realized because of great progress in the microprocessor technology, portable compact devices containing microcomputers, called as "intelligent devices", are popularized. As a result, processing operations are distributed from a large-scaled computer to a large number of intelligent devices, and furthermore, these intelligent devices (computers) are frequently moved in a production field. Eventually, since programs and setting values (conditions) of these intelligent devices are required to be changed in connection with movement of these intelligent devices, the workloads given to the programmers and the workers in the production fields are rapidly increasing.

SUMMARY OF THE INVENTION

An object of the present invention is to provide a distributed processing system and a cooperating method thereof, capable of reducing workloads given to a programmer and a worker in a field in such a case that the structure of this distributed processing system is changed, for example, when a setting place of an intelligent device and the like is moved.

A first distributed processing system, according to the present invention, is a distributed processing system for executing a series of processing operations by a plurality of computers, wherein: a first computer is comprised of a unit for transmitting a message containing an identifier related to a setting place of the computer; and a second computer is comprised of a unit for selectively receiving a message based upon the identifier. The computer in the above distributed processing system corresponds to, for example, a computer for controlling a control device and the like; and also corresponds to an intelligent device constituted by a control device and a computer, for executing a predetermined process operation.

A first cooperating method of a distributed processing system according to the present invention is a cooperating method of a distributed processing system for executing a series of processing operations by a plurality of computers, wherein: a first computer transmits a message containing an identifier related to a setting place of the computer; and a second computer selectively receives a message based upon the identifier.

In the above-described system and method, the message may further contain an identifier related to a device controlled by the above-mentioned computer.

A second distributed processing system according to the present invention is a distributed processing system for executing a series of processing operations by a plurality of computers, wherein: at least one computer among the plurality of computers is comprised of: a unit for seeking another computer when a place where the computer is set is changed, for example, the first-mentioned computer is set at a peripheral portion of the second-mentioned computer; and a unit for reading necessary data from another computer; and also at least one computer changes a setting condition based upon the read data to execute a process operation.

In this case, the above-described a unit for seeking another computer is comprised of a unit for transmitting positional information, for example, via a network to another computer, the positional information indicating a place where the computer is set; and the computer for receiving the positional information is comprised of: a unit for comparing the received positional information with positional information about a place where the own computer is set; and a unit for sending a response in the case that the received positional information is made coincident with the positional information about the place where the own computer is set.

Also, a first intelligent device according to the present invention is an intelligent device used in a distributed processing system for executing a series of processing operations by a plurality of intelligent devices, comprises: a unit for seeking another intelligent device when a place where the own intelligent device is set is changed, for example, the first-mentioned intelligent device being located around the second-mentioned intelligent device; and a unit for reading out necessary data from another intelligent device; wherein: the intelligent device changes a setting condition based upon the read data to execute the processing operation.

In this case, this intelligent device may be further comprised of: positional information managing unit for managing both positional information related to a past setting place and positional information related to a present setting place; and a unit for judging as to whether or not the place where the intelligent device is set is changed with reference to said positional information managing means.

Also, a second cooperating method of a distributed processing system according to the present invention is a cooperating method of a distributed processing system for executing a series of processing operations by a plurality of computers, comprising: a step for seeking another computer, e.g., a computer installed around the computer, when a place where the own computer is set is changed; a step for reading out necessary data from the another computer; and a step for changing a setting condition of the computer whose setting place is changed based upon the read data to execute the process operation. The necessary data corresponds to, for example, a parameter for setting a control device, a parameter for a communication of a computer, and a program executed by a computer.

In this case, the above-mentioned step for seeking another computer is comprised of: a step for registering positional information indicative of a place where a computer is set; a step for transmitting the registered positional information; a step for receiving the transmitted positional information by another computer; a step for comparing the received positional information with positional information indicative of a place where the own computer is set; a step for transmitting a response in such a case that the received positional information is made coincident with the positional information indicative of the place where the own computer is set; and a step for receiving the response by a computer which has firstly transmitted the positional information. Furthermore, when the above-explained positional information is coincident with each other, information related to an apparatus controlled by the own intelligent device may be included in the response to be transmitted.

Also, the second cooperating method may be further comprised of: a step for managing both positional information related to a place where a computer is presently set and positional information related to a place where the computer was set in the past, and for comparing the past positional information with the present positional information, whereby a judgment is made as to whether or not the setting place of the computer is moved. Also, the second cooperating method may be further comprised of a step for confirming a sort of a control device which is controlled by the sought computer.

A second intelligent device according to the present invention is an intelligent device for transmitting data received from a plurality of devices connected to the intelligent device, comprising: a unit for registering a position code with respect to each of the plural devices; a storage unit for storing the data received from the respective devices; a unit for writing data which are received from devices whose registered position codes are identical to each other into the same storage area of the storing means; and a unit for periodically transmitting the data stored in the storage unit to, for example, a network.

Also, a third intelligent device according to the present invention is an intelligent device comprising a computer and an I/O module functioning as an interface for input/output data of a device, wherein: the I/O module is comprised of: a unit for setting a position code; and a unit for transmitting data derived from the device to the computer by applying the set position code to the data; and the computer is comprised of: a storage unit for storing data received from the respective I/O modules; a unit for overwriting the data to which the same position code is applied into the same storage area of the storage unit; and a unit for transmitting the data stored in the storage unit to, for instance, a network.

In this case, the above-explained computer may be furthermore comprised of a table for managing a relationship between the position code and the area for storing the data of the storage unit, and may judge an area for storing the data received from the I/O module based on this table.

BRIEF DESCRIPTION OF THE DRAWINGS

For a better understanding of the present invention, reference is made of a detailed description to be read in conjunction with the accompanying drawings, in which:

FIGS. 3A and 3B are diagrams for showing a structural example of a positional information management table 300 and a control device management table 350, respectively, which are managed by each of the intelligent devices;

FIG. 19 is a diagram for schematically showing an internal structure of the intelligent block I/O according to the present invention;

FIG. 20 is a diagram for representing a structural example of a position ID management table 2100.

DETAILED DESCRIPTION OF THE PREFERRED EMBODIMENTS

Referring now to drawings, various preferred embodiments of the present invention will be described in detail.

Figure 1:
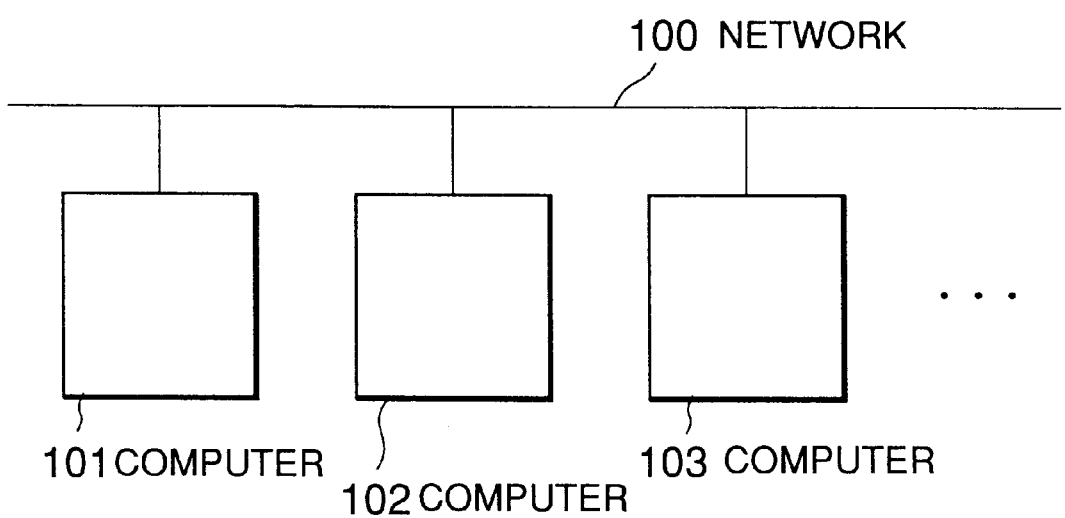
FIG. 1 is a conceptional drawing for schematically showing a distributed processing system to which the present invention is applied.

FIG. 1 conceptionally shows a distributed processing system to which the present invention is applied. As shown in FIG. 1, this distributed process system includes a plurality of computers 101, 102, 103 and the like, which are connected to a network 100. In this system, the respective computers send/receive messages via the network 100 to perform an overall processing operation. Each of these computers contains a microprocessor for performing a calculation, and a storage apparatus for storing data. In this case, a bus type network is used as the network. However, the present invention is not limited to the bus type network, but may be applied to an arbitrary type network. Wireless communication can be used for sending/receiving a message.

The First Embodiment:

Next, a distributed processing system according to a first preferred embodiment of the present invention will be described.

FIG. 2 is an explanatory diagram for explaining an intelligent device 200 which constitutes this first distributed processing system. In this first distributed processing system, a plurality of intelligent devices 200 are connected via a network 100 to each other so as to perform predetermined processing.

Figure 2A:
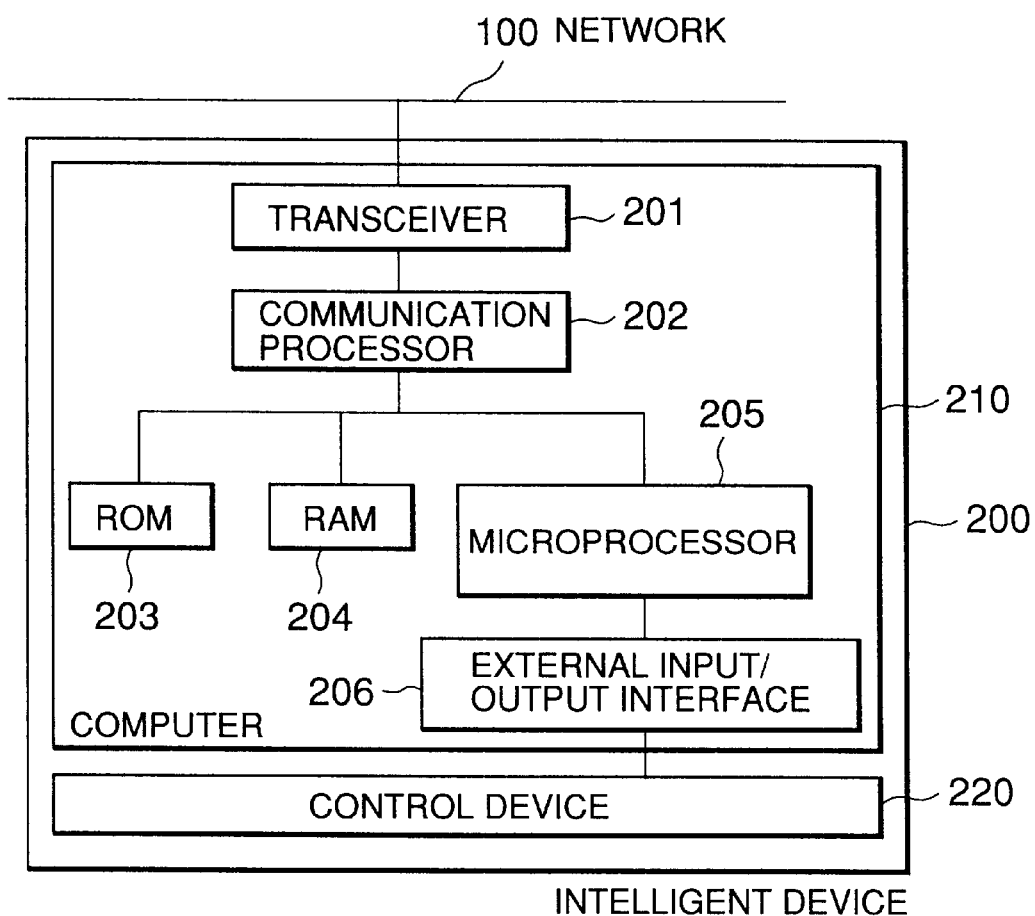
FIGS. 2A and 2B schematically represent an intelligent device 200 for constituting the distributed processing system.

FIG. 2A schematically shows an internal arrangement of the intelligent device 200. As shown in FIG. 2A, the intelligent device 200 is equipped with a computer 210 and a control device (control appliance) 220. The intelligent device 200 is a device (appliance) equipped with both a calculation function and an I/O function. For instance, as this intelligent device 200, the following sorts of devices are conceivable, e.g., an optical sensor (photoelectric sensor), an alarm device, a branching tap (Interconnect block), a bar code reader, an inverter, and an intelligent block I/O (remote I/O).

As shown in FIG. 2A, the computer 210 provided in the intelligent device 200 is equipped with a transceiver 201, a communication processor 202, a ROM (non-volatile memory) 203, a RAM (volatile memory) 204, a microprocessor 205, and an external I/O interface 206.

The computer 210 receives a message via the transceiver 201 from the network 100. The received message is processed by the communication processor 202. The communication processor 202 has a function for processing a preselected communication protocol, and judges the content of the received message.

The ROM 203 is a non-volatile memory device for storing a program executed by the microprocessor 205 in order to control the control device 220, and data required in various processing operations. The RAM 204 is a volatile memory device for storing data and the like which are temporarily used by the microprocessor 205 to execute the program.

The external I/O interface 206 is a device for controlling supply/reception of data between an external I/O (input/output) and the computer 210. This microprocessor 205 sends/receives control data to/from the control device 220 connected to the computer 220 via this external I/O interface 206.

Figure 2B:
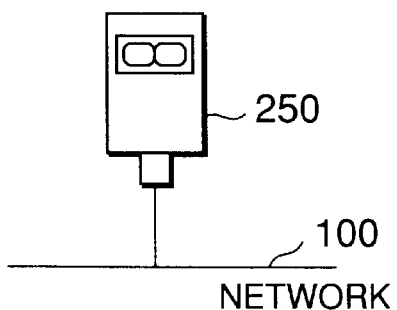

FIG. 2B is a diagram which shows an optical sensor 250 as a concrete example of the intelligent device 200. In the optical sensor 250 shown in FIG. 2B, the control device 220 senses, by way of infrared rays and the like, such a fact that an object passes in front of this optical sensor 250, and the computer 210 communicates with another intelligent device via the network 100, and controls the control device 220.

When a power supply is turned ON, the microprocessor 205 commences the execution of the program, and then the optical sensor 250 performs the sensing process operation of an object. Then, when an object is sensed by the control device 220, data for indicating that the object is sensed is supplied via the external I/O interface 206 to the microprocessor 205. When the microprocessor 205 receives the data for indicating that the object is sensed from the control device 220, this microprocessor 205 transmits a message for notifying that the object is sensed via the communication processor 202 and the transceiver 201 to the network 100.

The intelligent device 200 is provided with a positional information management table for managing the positional information indicative of a place where the own intelligent device 200 is installed. FIG. 3A is a diagram for showing a structural example of a positional information management table 300 which is managed by each of the intelligent devices. As shown in FIG. 3A, the positional information management table 300 is provided with a "position name" column 303 and a "position ID" column 304 as to each of a "past position" 301 and a "present position" 302. Into the "position name" column 303, the position name of the past or present intelligent device setting position is registered. Into the position ID column 304, a position ID, which is predetermined for a place that the intelligent device is to be set, is stored. Based upon this positional information management table 300, the respective intelligent devices can recognize the present setting places thereof. Also, a judgement is made as to whether or not an intelligent device is moved by comparing a position ID of a past position with a position ID of a present position.

Also, each of the intelligent devices 200 is provided with a control device management table for managing parameter information required to control the control device 220 built in the intelligent device 200. FIG. 3B is a diagram for showing a structural example of a control device management table 350. As shown in FIG. 3B, the control device management table 350 is constituted by a "control device sort" 351 for showing a sort of a control device, and a "parameter" 352 for controlling a control device. The "control device sort" 351 is constituted by a "name" 353 of a control device, and an "ID" 354 indicative of a sort (type) of a control device. The parameter column 352 is constituted by a "name" 353 of a parameter, and a "value" 354 of a parameter. In the example of FIG. 3B, the "control device sort" 351 is an "optical sensor", and an ID (=1) indicative of the optical sensor is stored into an "ID/value" 354. In the case of the optical sensor, as to the parameter 352, there are two fields of "reaction distance" (=50 cm), and "check condition" (=1). The "reaction distance" corresponds to a maximum distance value with which a sensor can react. The "check condition" is used to set the condition that an object is usually present in front of a sensor or not. In other words, depending on the "check condition", the sensor transmits data when the sensor senses that a new object appears or when the sensor senses that the object which is located in front of the sensor will disappear. For example, in the former case, "1" is set to the "check condition", whereas in the latter case, "10" is set to the "check condition".

Figure 4:
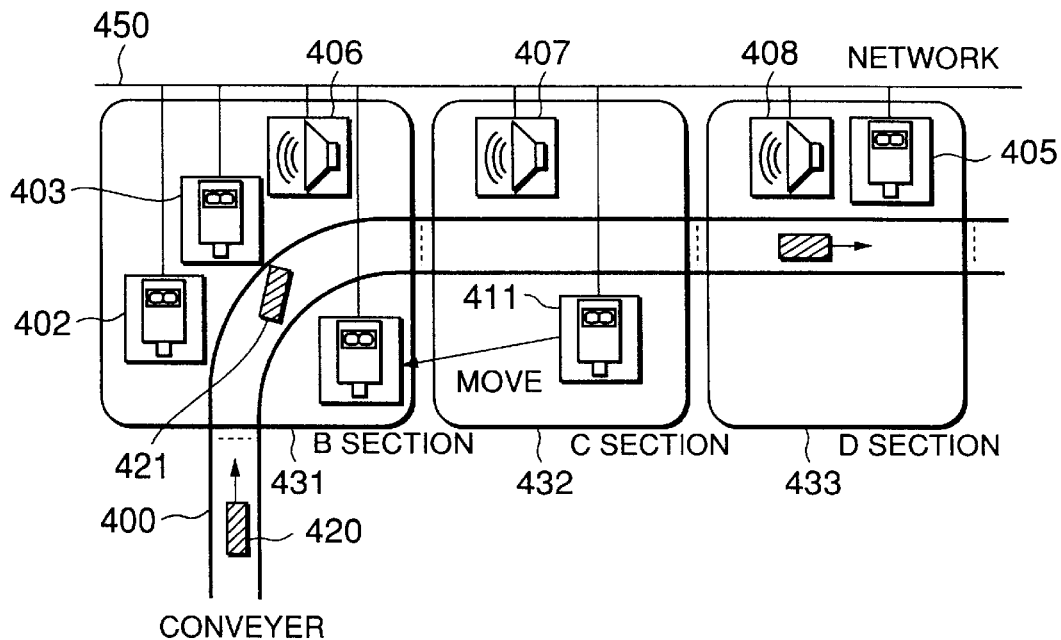
FIG. 4 is an illustration of a concrete application example of a first distributed processing system.

FIG. 4 is a diagram for illustratively showing a concrete application example of the first distributed processing system. As shown in FIG. 4, this system comprises optical sensors 402, 403, 405, 411; and alarm devices 406, 407, 408, which are connected via a network 450 to each other. These optical sensors and alarm devices are the intelligent devices as shown in FIG. 2A, and communicates with each other via the network 450.

In the application example of FIG. 4, a processed product 420 is conveyed on a conveyer 400. The optical sensors 402, 403, 405 and the like, which are installed beside the conveyer 400, check as to whether or not a processed product 420 is conveyed under normal condition. In other words, these optical sensors check as to whether or not the processed product is hooked in a half way of the conveyer 400. The processed product 421 of FIG. 4 indicates a hooked product.

The conveyer 400 is subdivided into three sections, namely a conveyer B section 431, a conveyer C section 432, and a conveyer D section 433. Then, predetermined position IDs are allocated to these conveyer sections, respectively.

The conveyer B section 431 has a curved portion where a processed product is readily hooked thereon, and is a place which needs to be monitored with higher attention. Under such a circumstance, two sets of the optical sensors 402 and the optical sensor 403 are used to monitor the same place. With these two sensors, even if one optical sensor is mechanically destroyed, the monitoring can be continued with the other sensor. The alarm device 406 is installed in the conveyer B section 431 in addition to these optical sensors 402 and 403. When the optical sensors 402 and 403 sense that the processed product is hooked within the conveyer B section 431, this alarm device 406 notifies this trouble to an operator by producing alarm sound and also by turning ON a lamp.

The optical sensor 411 monitors the conveyer C section 432. When this optical sensor 411 senses that the processed product is hooked within the conveyer C section 432, the alarm device 407 notifies this trouble to the operator.

The optical sensor 405 monitors the conveyer D section 433. When this optical sensor 405 senses that the processed product is hooked within the conveyer D section 433, the alarm device 408 notifies this trouble to the operator.

Now, it is assumed that the below-mentioned conditions are observed while the distributed processing system shown in FIG. 4 is operated. Within the conveyer C section monitored by the optical sensor 411, no processed product was hooked in the past. On the other hand, within the conveyer B section monitored by both the optical sensor 402 and the optical sensor 403, the processed product was frequently hooked, and although two sets of the optical sensors monitored this conveyer B section 431, the troubled optical sensor could not sense that the processed product was hooked. Therefore, the optical sensor 411 which is installed in the conveyer C section 432, where the processed product was not hooked in the past, is now moved to the conveyer B section 431, where the trouble frequently occurs, so as to more effectively monitor the conveyer B section 431.

Figure 5:
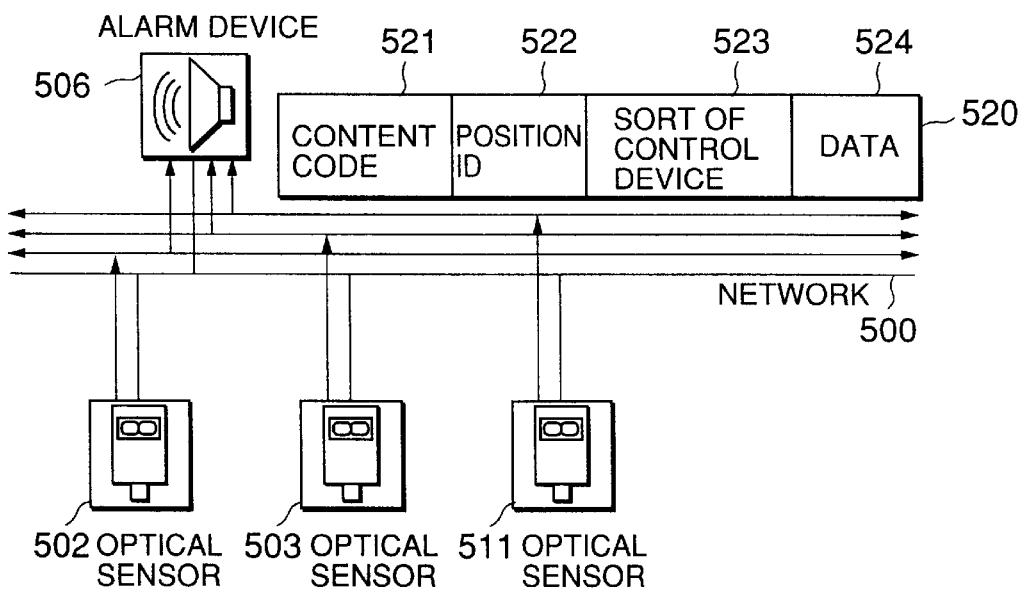
FIG. 5 is a diagram for illustratively showing a transmission/reception of a message between an optical sensor and an alarm device.

FIG. 5 is a diagram for showing a message transmission/reception between the optical sensors and the alarm device, which are installed in the conveyer B section 431. As shown in FIG. 5, a message 520 which is supplied by each of the optical sensors to the network is constituted by a content code 521, a position ID 522, a control device sort 523, and data 524. The data 524 may not be present, depending upon a sort of a message.

The content code 521 is data indicative of a message sort. The position ID 522 is data indicative of a setting place of an intelligent device which transmits a message (in this case, conveyer B section). The control device sort 523 is a sort of a control device of an intelligent device which sends a message (in this case, optical sensor). The data 524 is data detected by a control device of an intelligent device which sends a message.

A description will now be made of operations of both the optical sensors 502 and 503, and the alarm device 506, which are provided in the conveyer B section 432. Both the optical sensor 502 and the optical sensor 503 monitors the conveyer B section 431, and adds the content code 521, the present position ID 522, and the control device sort ID 523 to the data 524, and then broadcasts the added data to the network 500 under normal condition. This content code 521 indicates that this data corresponds to normal control data. The present position ID (in this case, position ID representative of conveyer B section) 522 is registered in the position information management table 300. The control device sort ID 523 is registered in the control device management table 350.

In the case that the optical sensor 502 and the optical sensor 503 sense such a fact that a processed product is present in front of these optical sensors for a time period longer than, or equal to a predetermined time period, these optical sensors recognize that the processed product is hooked. Then, the optical sensors 502 and 503 broadcast the below-mentioned message to the network 500. This message is constituted by the content code 521 indicative of an abnormal state notification message, the position ID 522 indicative of the conveyer B section, the control device sort 523 indicative of the optical sensors, and the data 524. The abnormal state notification message is a message to notify an occurrence of an abnormal condition.

The alarm device 506 selectively receives via the network 500 the abnormal state notification message which is transmitted from the optical sensor installed in the conveyer B section from the messages broadcasted to this network 500, and produces an alarm upon receipt of the relevant message. As a result, the alarm device 506 can receive the abnormal state notification messages sent from the optical sensor 502 and the optical sensor 503, and produce an alarm.

Next, a description will now be made of operations of the optical sensor 511 which has been moved from the conveyer C section 432. When the setting position of this optical sensor 511 is changed from the conveyer C section 432 to the conveyer B section 431, the position ID indicative of the conveyer section B431 is first registered, and then saved in the positional information management table 300.

Figure 6:
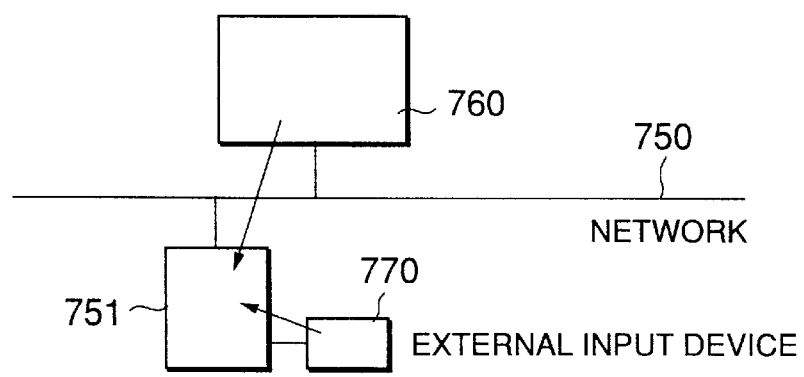
FIG. 6 is an explanatory diagram for explaining a method for registering positional information into an intelligent device.

FIG. 6 is an explanatory diagram for explaining a method for registering positional information into an intelligent device such as an optical sensor. To register the positional information into the intelligent device 751, various methods can be conceived.

A first registering method is given as follows. That is, the positional information is registered by using an external input device 770 connected to the intelligent device 751. In this case, an operator connects the external input device 770 such as a handy terminal and a personal computer to the intelligent device 751 so as to register positional information. As another positional information registering method, the positional information may be automatically acquired from the external input device 770 before the intelligent device 751 commences the communication. In this case, the external input device 770 corresponds to, for example, a receiver apparatus of satellite information, and both a latitude value and a longitude value, which are received by the external input device 770, are read by the intelligent device 751. The intelligent device 751 receives a set of the latitude/longitude values, for example, 50 deg. 55 min., and 34 deg. 30 min. from the external input device 770. This intelligent device 751 produces a proper position ID (for example, 50553430) and a proper position name based on the received values, and thereafter registers these produced position ID and position name into the positional information management table 300. Alternatively, the positional information may be registered via the network 750 by employing a computer 760 equipped with an input device such as a workstation and a personal computer.

The optical sensor 511 into which the positional information has been registered in the above-explained manner commences the monitoring operation in the conveyer B section 431. Then, similar to the optical sensors 502 and 503, when this optical sensor 511 recognizes that the processed product is hooked, this optical sensor 511 broadcasts the following message to the network. This message is constituted by the content code 521 indicative of the abnormal state notification message, the position ID 522 indicative of the conveyer B section, the control device sort 523 indicative of the optical sensor, and the data 524. When the abnormal state notification message sent from the optical sensor 511 is received, the alarm device 506 produces an alarm. Since the alarm device 506 selectively receives the message based upon the position ID 522, even when this alarm device 506 receives an abnormal state notification message which is sent from the optical sensor connected to another section, this alarm device does not mistakenly issue an alarm.

Also, the alarm device 506 executes the alarm process operation based upon the content code 521, the position ID 522, and the control device sort 523, which are contained in the message, and therefore, does not especially recognize which optical sensor sends the message.

As a result, even when an optical sensor for monitoring the conveyer B section 431 is newly added, there is no specific influence which will be given to the alarm device 506. Therefore, the setting condition of the alarm device 506 need not be changed, but also the program need not be additionally provided, or changed. Similarly, neither the optical sensor 502, nor the optical sensor 503 is required to be changed. As previously explained, the optical sensor 511 can be moved to the conveyer B section 431 without changing the existing facility, and furthermore, the abnormal state can be effectively sensed.

In the first distributed processing system according to the first embodiment, the intelligent device connected to the network broadcasts the message containing the positional ID to the network, and another intelligent device connected to this network selectively receives the message based upon the position ID. As a consequence, even when the structure of this first distributed processing system is changed by moving, or additionally providing the device, setting of the position ID of this device is merely changed, so that the system structure can be readily changed. In the conventional distributed processing system, a large number of setting conditions and the programs are required to be changed in order to add and/or change a device in this system. To the contrary, according to the first distributed processing system of this embodiment, a device can be added and/or changed by merely changing such a simple parameter. As a result, the workloads given to the programmer and the system engineer can be greatly reduced, and furthermore the working time thereof can be shortened.

The Second Embodiment:

Next, a distributed processing system according to a second preferred embodiment of the present invention will now be explained.

In the above-explained first distributed processing system, only the position ID of the intelligent device is changed, so that the intelligent device can be added and/or changed in a simple manner, and thus, the system structure can be readily changed. In the second distributed processing system, when an intelligent device is newly installed, this newly installed intelligent device cooperates with other intelligent devices which are installed at a peripheral area of this installed place and shares necessary parameter information with the other intelligent devices. Therefore, newly installed intelligent device can execute the same control operation as that of the peripherally-provided intelligent devices without changing the setting condition by an operator.

Figure 7:
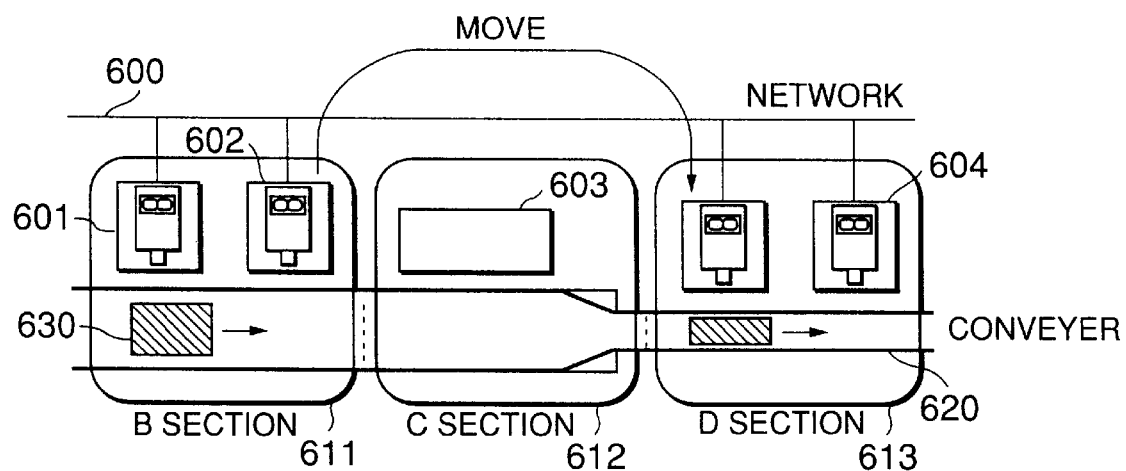
FIG. 7 is an illustration for showing a structural example of a second distributed processing system according to the present invention.

FIG. 7 illustratively shows a structural example of a distributed processing system according to a second preferred embodiment of the present invention. As shown in FIG. 7, in this second distributed processing system, an optical sensor 601, another optical sensor 602, a processing machine 603, and another optical sensor 604 are connected to a network 600. A communication is carried out via this network 600. The optical sensor 601, the optical sensor 602, the processing machine 603, and the optical sensor 604 correspond to such intelligent devices similar to those shown in FIG. 2A, respectively. Also, each of these intelligent devices manages both the positional information management table 300 and the control device management table 350 as shown in FIG. 3.

The optical sensor 601, the optical sensor 602, and the optical sensor 604 monitor processed goods (products) 630 conveyed on a conveyer 620. It should be understood that the conveyer 620 is subdivided into three sections of a conveyer B section 611, a conveyer C section 612, and a conveyer D section 613. Both the optical sensor 601 and the optical sensor 602 monitor the conveyer B section, whereas the optical sensor 604 monitors the conveyer D section.

The processing machine 603 mechanically processes the processed goods 630 conveyed on the conveyer 620. A volume and a size of a processed product 630 which is not yet processed by the processing machine 603 are different from a volume and a size of a processed product 630 which has been processed by the processing machine 603. As a result, a width of a conveyer provided in the conveyer B section 611 is different from a width of a conveyer provided in the conveyer C section 613.

In such a second distributed processing system, the following case will be considered. That is, the optical sensor 602 which has been installed in the conveyer B section 611 is newly moved to the conveyer D section 613 in order to effectively monitor the conveyer D section 613.

In FIG. 7, while the processing is carried out in the conveyer B section 611, the optical sensor 602 senses an object separated apart from a place by up to 50 cm in accordance with a width of the conveyer (for example, 50 cm) within the conveyer B section 611. In other words, "50" is set to a reaction distance parameter of the control device management table 350. On the other hands, a width of the conveyer within the conveyer D section 613, which is a new setting place for the optical sensor 602, is narrow, namely 20 cm. As a result, if the value of the reaction distance parameter of the control device management table 350 remains as "50", then there are such probabilities that when an operator passes through a side portion of the conveyer, the optical sensor mistakenly recognizes this operator as the processed product 630. Therefore, a distance used to sense an object must be set to 20 cm. In other words, the value of the reaction distance parameter of the control device management table 350 must be changed from "50" to "20". In accordance with the second distributed processing system, changing of this reaction distance parameter is carried out by way of a cooperative work between intelligent devices. That is to say, the optical sensors which are installed in the same conveyer D section 613 are found out, and thereafter, a value of a parameter suitable for the conveyer D section 613 is read out, and the value of the own parameter is updated by using this read parameter.

Figure 8:
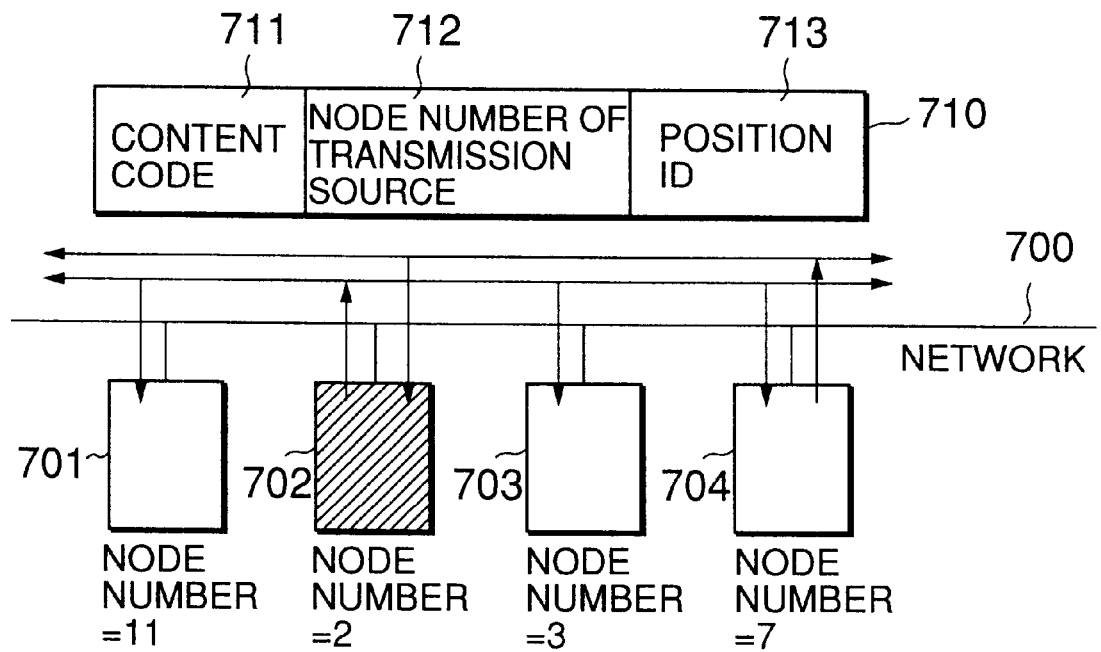
FIG. 8 is an explanatory diagram for explaining a method for seeking another intelligent device installed in the same place.

FIG. 8 is an explanatory diagram for explaining a method for seeking other intelligent devices installed in the same place. First, it is now assumed that a first intelligent device 701, another intelligent device 703, and another intelligent device 704 are connected to a network 700, and execute a process operation. Then, the following case will now be considered in this second system. That is, an intelligent device 702 is newly added to this network 700 (otherwise, a setting place of an existing intelligent device 702 is changed). In this case, a new position ID is firstly registered to a positional information management table saved in the intelligent device 702. This new position ID is registered in a similar method to, for example, the position-ID registering method as previously explained as to the first system.

When the new position ID is registered, the intelligent device 702 broadcasts a message used to seek another intelligent device located in the same place (which will be referred to as a "retrieve message" hereinafter) to the network 700. The retrieve message 710 is constituted by a content code 711, a node number 712, and a position ID 713. The content code 711 indicates that this message is the retrieve message. The node number 712 is a unique number set to each of the intelligent devices (in the case of intelligent device 702, the node number is "2"). The position ID 713 indicates a setting position of an intelligent device registered in the positional information management table.

When the retrieve message 710 is received by each of the intelligent devices connected to the network 700, this intelligent device compares the position ID 712 contained in the message with the position ID registered in the own positional information management table 300. As a result, in the case that the position ID 712 is coincident with the registered position ID, a response message is returned. The response message has the same format as that of the retrieve message 710.

In the system of FIG. 8, the following assumption is made. That is, the intelligent device 704 is set at the same place of the intelligent device 702. In other words, the same position ID as that of the intelligent device 702 is registered into the positional information management table 300 of the intelligent device 704.

In this case, upon receipt of the retrieve message 710, the intelligent device 704 makes up a message by using the content code 711 indicative of a response message, an own node number (="11") as a transmission source node number 712, and the same position ID as that of the retrieve message. Then, the intelligent device 704 broadcasts this made-up message. The intelligent device 702 receives this response message, and can get the node number of another intelligent device set at the same place. Alternatively, a control device sort may be involved in the retrieve message 710 and/or the response message similar to the first system.

Next, process operations of the optical sensor 602 in such a case that this optical sensor 602 is moved from the conveyer B section to the conveyer D section will now be described more in detail.

Figure 9:
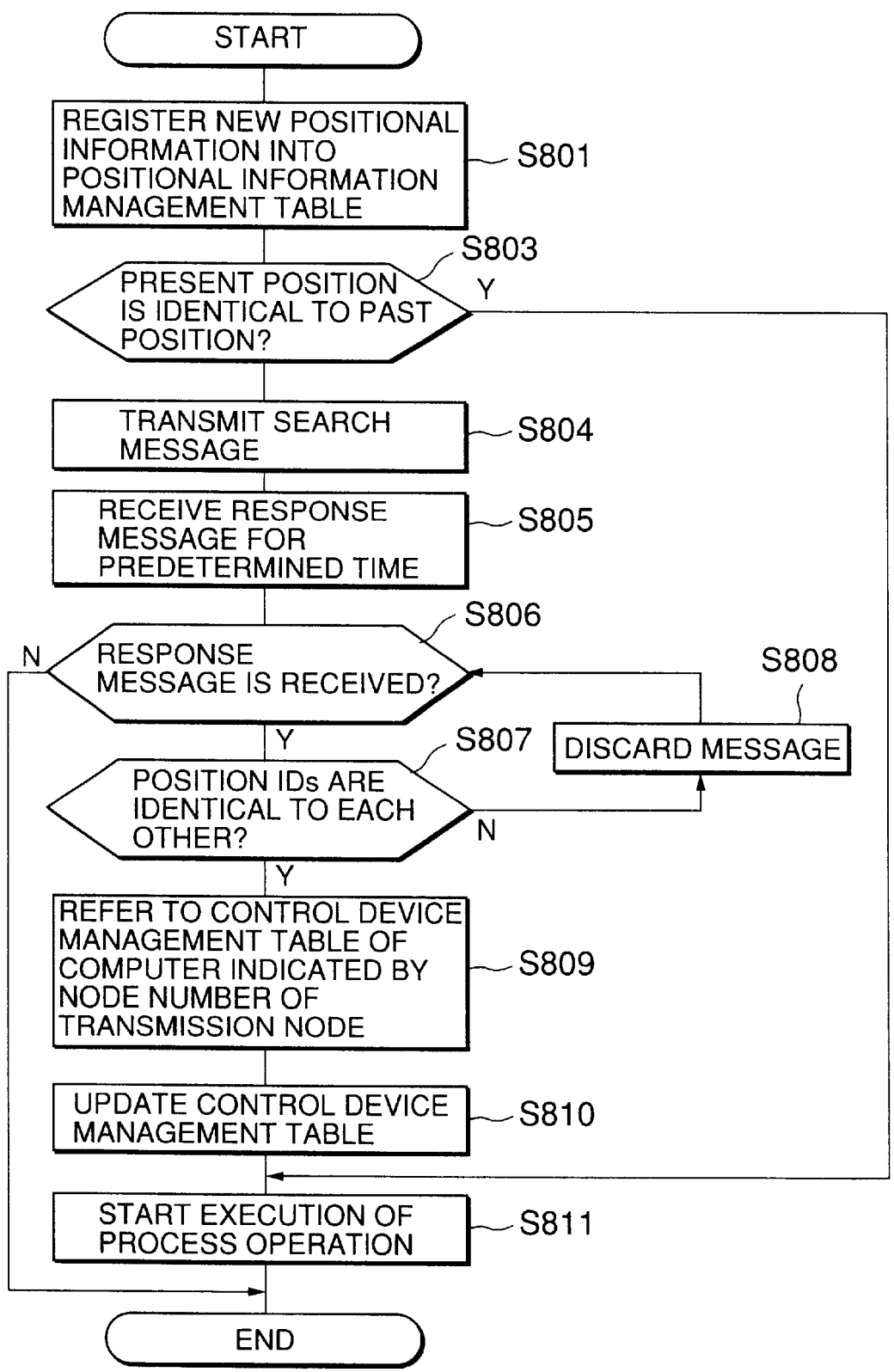
FIG. 9 is a flow chart for describing a process operation executed in a moved intelligent device.

FIG. 9 is a flow chart for describing process operations executed in the optical sensor 602 which is moved from the conveyer B section to the conveyer D section. First, a register operation of new positional information is carried out (step S801). That is, the position ID and the like of the conveyer D section 613 are registered into "present position" of the positional information management table 300 of the optical sensor 602. It should also be noted that at this stage, the position ID and the like of the conveyer B section 611, which is the old positional information, are stored into "past position" of the positional information management table 300.

When the register operation of the positional information is accomplished, the position ID of the past position is compared with the position ID of the present position (step S803). As a result, when the position ID of the past position is coincident with the position ID of the present position ("Y" at step S803), it is so judged that changing of the setting is not required. Then, the process operation for monitoring the processed product is commenced under the same setting condition as the conventional setting condition (step S811).

On the contrary, in the case that the position ID of the past position is different from the position ID of the present position ("N" at step S803), namely when the parameter of the optical sensor 602 is required to be updated, a search message is transmitted so as to seek another intelligent device located at the same setting place (step S804). Then, a response message in response to the search message is received for a predetermined time period (step S805), and a check is made as to whether or not a response message is received after such a predetermined time period has passed (step S806). As a result, when the response message can not be received ("N" at step S806), it is determined that there is no cooperative intelligent device, and the process operation is finished. In this case, the optical sensor 602 requires the parameter setting operation executed by the operator.

On the other hand, in the case that either one response message or a plurality of response messages are received ("Y" at step S806), a comparison is made between a position ID 713 contained in the received response message and the position ID of the present position stored in the own positional information management table 300 (step S807).

As a result of this comparison, when the position ID's are not coincident ("N" at step S807), the received response message is discarded (step S808). Then, another check is made as to whether or not another response message is present (step S806), and in the case that there is completely no received response message since the message is discarded ("N" at step S806), it is determined that there is no cooperative intelligent device. Accordingly, the process operation is finished. Also, in this case, the parameter value must be set by the operator.

On the other hand, when such a response message is present whose position ID 713 is coincident with the position ID of the present position ("Y" at step S807), the transmission source node number 712 contained in this received response message is read out. Using the node number, a sort of a control device is inquired to the intelligent device which has sent this response message. If such a control device sort is added to either a search message or a response message and then the message added with this control device sort is transmitted, such an inquiry of the control device sort can be omitted.

As a result of this inquiry, when the intelligent device of the same control device is present (namely, optical sensor in this case), a parameter value is read out from the control device management table of this intelligent device (step S809). Then, the value of this read parameter is registered into the own control device management table 350 (step S810). In this case, the value of the old parameter is overwritten by the above-described parameter value to be deleted. Then, a process operation based upon a newly set parameter is commenced (step S811).

In such a case that the same sort of plural intelligent devices are present in the same section, a value of a parameter is inquired to each of these plural intelligent devices. In this case, when the inquired results are not equal to each other, it is assumed that there is a certain problem in setting of other intelligent devices, and thus the process operation is ended. Alternatively, even when the inquired results are not equal to each other, a parameter value may be read out from an arbitrary intelligent device, and then this read parameter may be set to the own node.

In the above-described second distributed processing system, the value of parameter which is used to control the control device built in the intelligent device is read out from another intelligent device. The present invention is not limited to this case, but may be applied to another case. For example, data such as communication setting and an application program may be written into the own intelligent device, which are required by the intelligent device.

Figure 10:
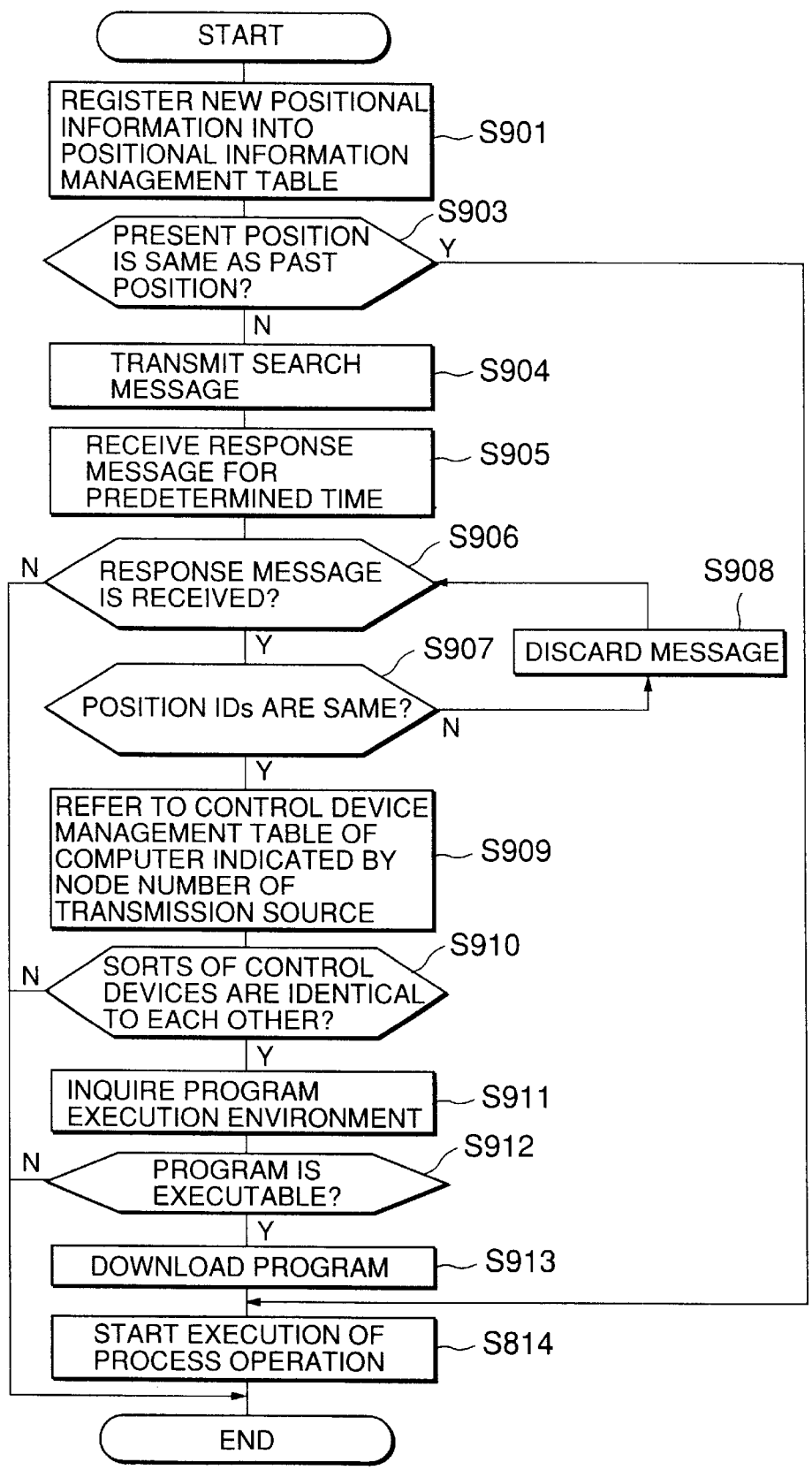
FIG. 10 is a flow chart for describing a process operation of an intelligent device in the case that an application program is read.

FIG. 10 is a flow chart for explaining a process operation of an intelligent device in the case that an application program is read in this intelligent device. It should be understood that contents of process operations defined at steps S901 to S908 are the same as those defined at the steps S801 to S808 of FIG. 9.

When an intelligent device located at the same place is inquired and then a response message whose position ID is coincident with the position ID of the present position is received by executing the process operations defined at the step S901 to the step S908, an inquiry is made of a control device sort for an intelligent device indicated by a transmission source node number (step S909). As a result of this inquiry, in such a case that there is no intelligent device whose control device sort is coincident ("N" at step S910), the process operation is directly ended.

On the other hand, when there is an intelligent device whose control device sort is coincident ("Y" at step S910), an execution environment of an application program is subsequently inquired (step S911). It should be understood that as the execution environment of the application program, a memory capacity and the like which are required to execute the application program are previously registered in each of the intelligent devices.

A check is made as to whether or not the application program can be executed in the own intelligent device based upon the inquired execution environment (step S912). As a result, when this application program cannot be executed ("N" at step S912), it is not possible to execute a process operation equivalent to that of another cooperative intelligent device, and the process operation is completed. On the contrary, when the application program can be executed (for example, when own intelligent device has a memory capacity capable of executing process operation) ("Y" at step S912), an application program is downloaded from another intelligent device, and then is stored into a program storage area of a RAM in the own intelligent device (step S913). At this time, a parameter value required to execute the application program is also downloaded with this application program. After the application program has been stored into the own intelligent device, the execution of this application program is commenced (step S914).

In the above-described second distributed processing system, one intelligent device whose setting place has been changed seeks other intelligent devices which are installed at the same setting place and execute the same control process operation based upon the positional information related to the place where the first-mentioned intelligent device has been newly set. Then, the newly set intelligent device reads out the parameter value required to execute the program and the application program from the other intelligent devices, and sets these parameter value/program to the own device so as to commence a proper process operation. In other words, even when one intelligent device is moved, the information about the setting place of the intelligent device is merely changed, and this intelligent device cooperates with other intelligent devices, so that the system structure can be automatically changed. In the conventional distributed processing system, every time the control device is moved/set, such a workload as adjusting of parameter values is required. On the contrary, in this second distributed processing system, neither the programmer nor the operator is required to change the program and the parameter value. As a result, the workloads given to the floor engineer, who adjusts the device and the like in the production field, and the system engineer, who must change the program every time the device and the like are moved and set, can be greatly reduced.

More specifically, in a large-scaled distributed processing system, more than several thousands of intelligent devices may be connected to a network. In this case, every time a system is changed, or a maintenance work is carried out, a large number of intelligent devices are moved and/or replaced. It is practically difficult to manage these intelligent devices one by one, and also set/change parameter values. Thus, very heavy workloads are required. On the contrary, in accordance with the second distributed processing system, since the workload required to set/change the parameter values in connection with the movement of the setting place can be largely reduced, there are many merits when intelligent devices are very frequently moved and/or replaced.

The Third Embodiment:

Next, a distributed processing system according to a third preferred embodiment of the present invention will now be explained.

In the above-explained first distributed processing system, in the output device such as the alarm device and the like, the message is selectively received based upon the position ID. As a result, the intelligent device can be moved and/or can be newly employed without changing the setting conditions of the existing intelligent devices. In the second distributed processing system, when an intelligent device is newly installed, this newly installed intelligent device cooperates with other intelligent devices which are installed at the same place. The newly installed intelligent device read out parameter information and a program from other intelligent devices and execute the same process operation. In the below-mentioned third distributed processing system, a plurality of control devices are connected to one intelligent device, and such a control device which is installed at the same place is recognized from these control devices. Then, cooperative operations can be realized between the control devices installed at the same place.

Figure 11:
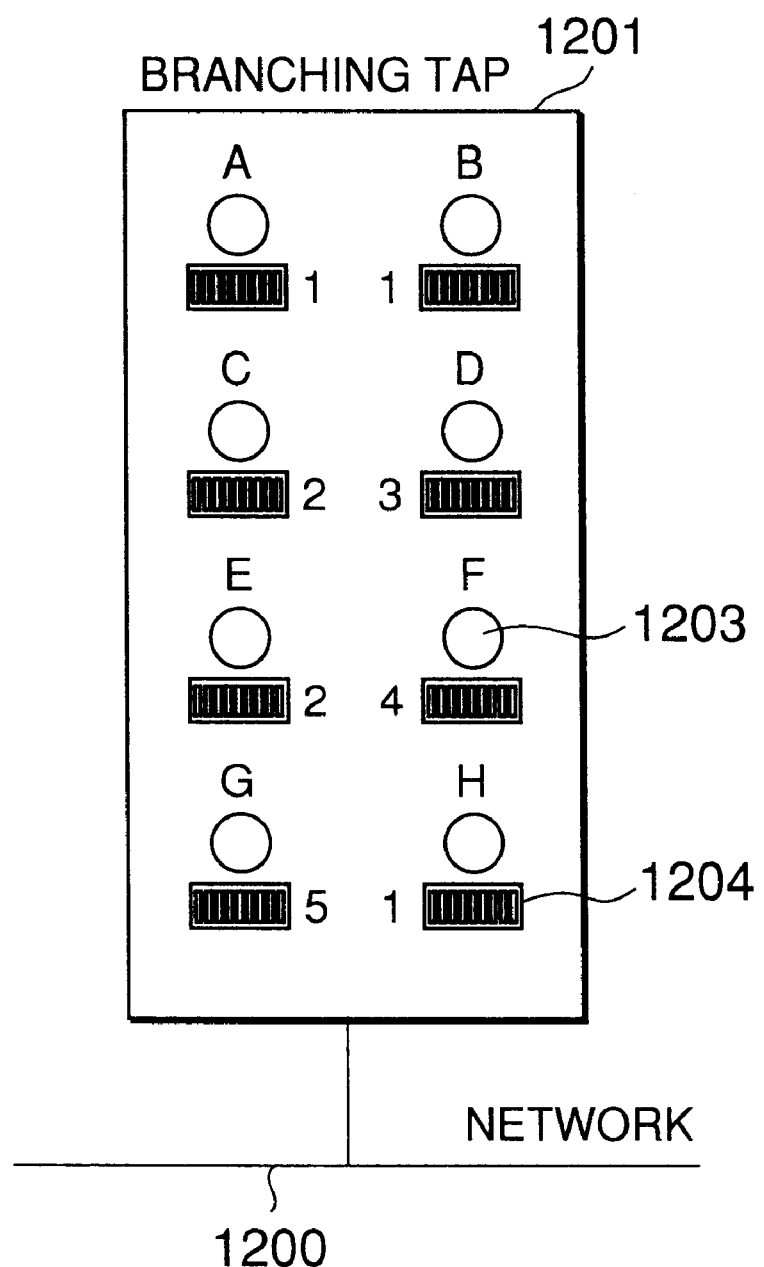
FIG. 11 is an illustration of a structure of a branching tap 1201 according to the present invention.

FIG. 11 illustratively shows a structure of a branching tap 1201 according to the present invention. The branching tap 1201 is an intelligent device containing a microprocessor, and is connected to a network 1200.

As shown in FIG. 11, the branching tap 1201 is equipped with a plurality of connect ports 1203. Various devices can be connected via cables to these connect ports 1203. The devices connected via the cables to the connect ports 1203 are devices having no microprocessor (referred to as a "non-intelligent device"). This non-intelligent device transmits an electric signal via a cable to the branching tap 1201. Since these devices are not provided with the microprocessor, these devices can transmit only simple information such as ON, or OFF (1, or 0). In the branching tap 1201 shown in FIG. 11, there are eight connect ports 1203 named as "A" through "H". Since a single device is connectable to each of these 8 connect ports 1203, 8 devices are connectable to this branching tap 1201 in total. The branching tap 1201 processes data information received from the devices and transmits the properly-processed data information to the network 1200.

Also, a dip switch 1204 is provided with the branching tap 1201 for each of the connect ports 1203. The dip switches 1204 are used to set position IDs of positions of these device with respect to the respective connect ports 1203. An operator manipulates this dip switch 1204 so as to register a position ID of a setting place of a device.

Figure 12:
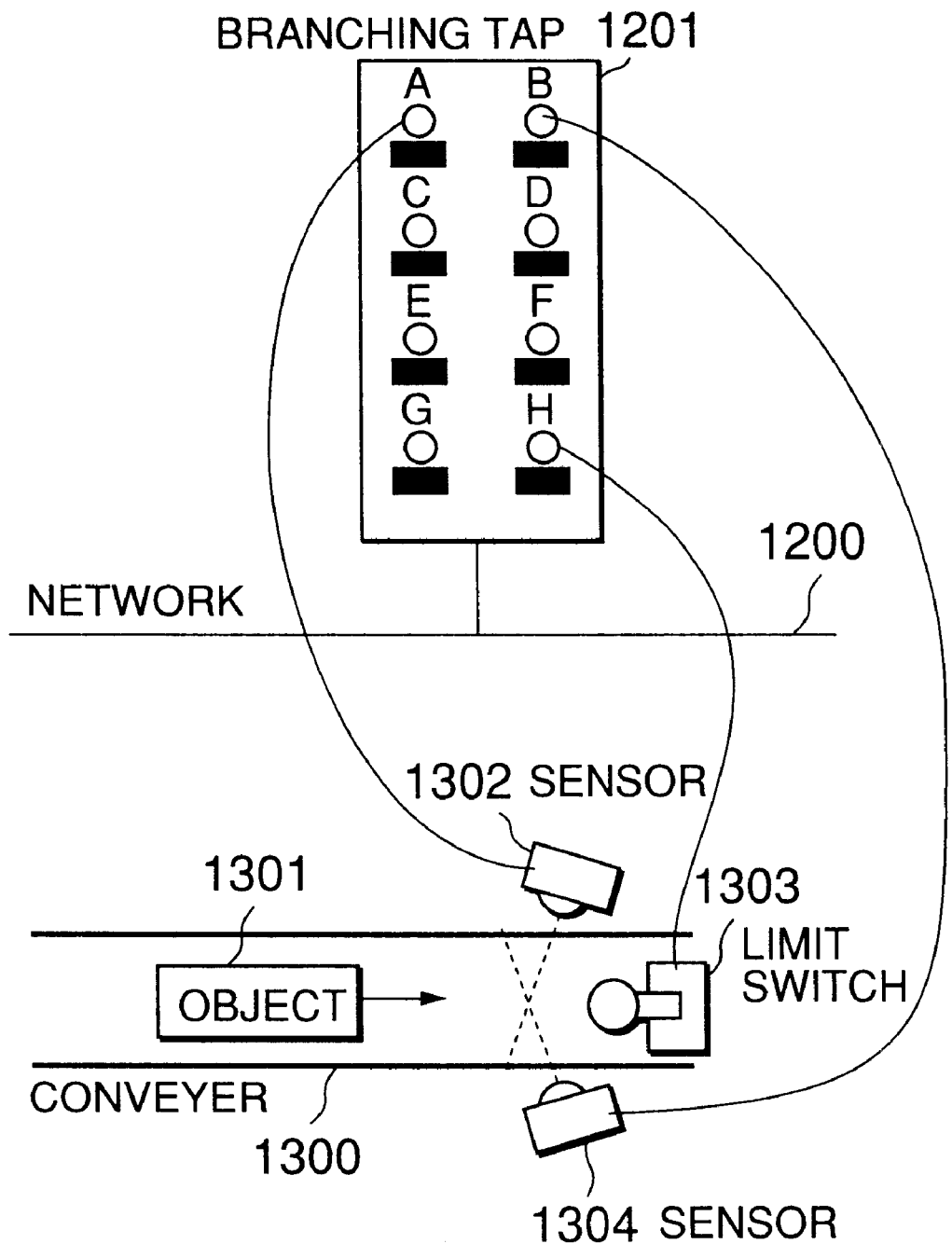
FIG. 12 illustratively shows an application example of the branching tap 1201 to an actual system.

FIG. 12 is an illustration in the case that the branching tap 1201 is applied to an actual distributed processing system. In this actual system, an object 1301 is moved, or transported on a conveyer 1300, and approaching of this object 1301 is sensed by optical sensors 1302 and 1304, and a limit switch 1303. The limit switch 1303 is a device for sensing a physical contact between the object and the own limit switch.

The optical sensor 1302, the optical sensor 1304, and the limit switch 1303 are connected to the connect ports "A", "B", and "H" of the branching tap 1201, respectively. When the moving object shields sensing light thereof, these optical sensors 1302/1304 sense this change to send ON information (namely, data of "1") to the branching tap 1201. When the object is made in contact with this limit switch 1303, the limit switch 1303 senses this change to thereby transmit ON information (namely, data of 1) to the branching tap 1201. These three devices are used to sense approaching of the object, and are triplicated in order to increase reliability thereof. Also, when any one of these devices senses the object, this sensing device transmits the ON information to the branching tap 1201. Upon receipt of the ON information sent from any one of these three devices, the branching device 1201 transmits to the network 1200 such a message capable of notifying that the object is sensed. The transmitted message is received by, for example, a motor for driving the conveyer 1300. Then, the motor which receives the message stops its rotation so as to stop the conveyer 1300.

Figures 13, 14:
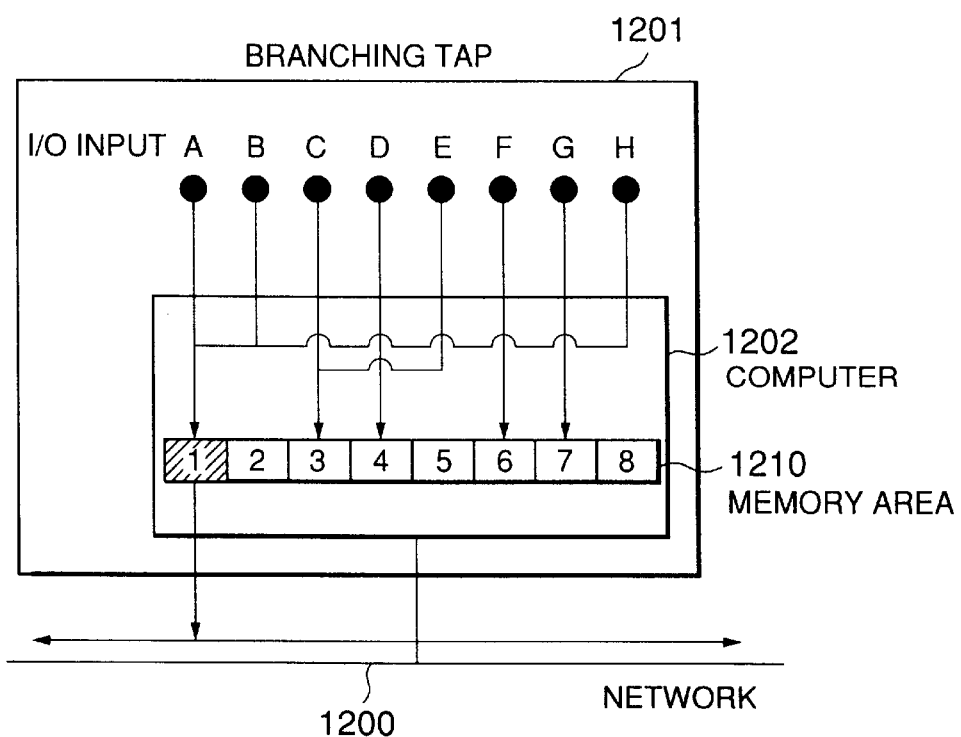
FIG. 13 is a diagram for showing a structural example of a connect port management table 1400.
FIG. 14 is an illustration for schematically showing an internal structure of the branching tap 1201.

The branching tap 1201 holds a connect port management table for managing a relationship between the connect ports and position IDs. FIG. 13 is a diagram for showing a structural example of a connect port management table 1400. As shown in FIG. 13, the connect port management table 1400 is arranged by a connect port number column 1401 and a position ID column 1402.

Numerals "1" to "8" of the connect port number column 1401 correspond to the connect port "A" to the connect port "H", respectively. The set value of the dip switch 1204 of each of the connect ports 1203 is set to the position ID column 1402. When the power supply is turned ON, or a user issues an instruction, the branching tap 1201 reads the set values of the 8 dip switches 1204, and then registers these read values into the position ID column 1402 of the connect port management table 1400.

In the case shown in FIG. 13, the same position ID (=1) is registered to the connection port numbers="1", "2", and "8". This implies that the devices connected to the connect port A, the connect port B, and the connect port H are installed at the same place, namely are multiplexed.

FIG. 14 schematically shows an internal arrangement of the branching tap 1201. The branching tap 1201 contains a computer 1202 similar to the computer 210 shown in FIG. 2A.

A memory area 1210 for storing input data supplied from the respective connect ports is reserved on a RAM employed in the computer 1202. The memory area 1210 is subdivided into 8 areas. Thus, the 8 memory areas are reserved with respect to the respective connect ports. The memory areas allocated to the respective connect ports will be referred to as a memory area "1" to a memory area "8". In this case, since the input data from the connect port 1203 is either ON or OFF ("1", or "0"), a memory capacity of each of the memory areas "1" through "8" which is reserved to the respective connect ports is equal to 1 bit. Therefore, a memory capacity of the entire memory area 1210 is equal to 1 byte (=8 bits).

In such a case that the devices connected to the connect ports are not installed at the same place, namely when all of the set values of the dip switches are different from each other, the data received from the respective connect ports are stored into the memory areas corresponding to the connect ports. For example, the data received from the connect port A is overwritten into the memory area 1 under control of the microprocessor employed in the computer 1202, whereas the data received from the connect port B is overwritten into the memory area 2. However, as shown in FIG. 13, in such a case that the values of the position ID column 1402 of the connect port management table 1400 are duplicated, the microprocessor assumes that the devices connected to the connect ports whose position IDs are equal are multiplexed. Thus the data sent from the device is not overwritten into the memory area corresponding to the connect port, but is overwritten into such a memory area which is allocated to the connect port whose connect port number is the smallest number among the multiplexed devices.

In the connect port management table 1400 shown in FIG. 13, the position IDs of the connect port numbers="1", "2", and "8" are equal (position IDs="1"). Also, the position IDs of the connect port numbers="3" and "5" are duplicated (position IDs="2"). In this case, the microprocessor overwrites the data received from the connect port "A", the connect port "B", and the connect port "H" into the same memory area 1. Also, the microprocessor overwrites the data received from the connect port C and the connect port E into the same memory area 3.

Figures 15, 16:
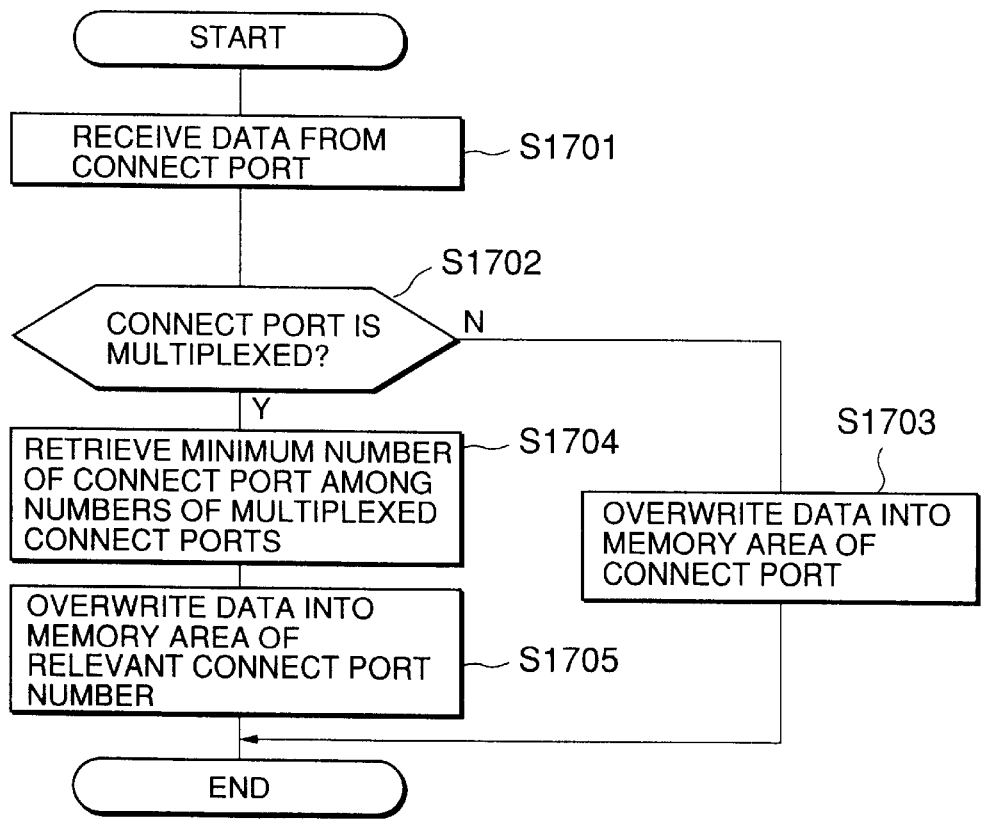
FIG. 15 illustratively shows a structural example of a content code management table 1600.
FIG. 16 is a flow chart for describing a process operation in the case that the branching tap 1201 writes data received from a device into a memory area.

The branching tap 1201 holds a content code management table for managing a relationship between a memory area number and a content code. FIG. 15 is a diagram for schematically showing a structural example of a content code management table 1600. As shown in FIG. 15, the content code management table 1600 is constituted by a memory area number column 1601 and a content code column 1602.

For example, the microprocessor provided in the computer 1202 adds a content code="CC1" to data which is overwritten into the memory area 1 with reference to the content code management table 1600, and then transmits this data with the content code to the network 1200. It should be noted that no content code is registered into such a memory area to which data is not written, because the devices are multiplexed. The data of the content code column 1602 in the content code management table 1600 is set, for instance, via the network 1200 by way of a personal computer connected to the network 1200.

Next, a description will now be made of a process operation executed in the branching tap 1201. FIG. 16 is a flow chart for describing process operations executed in such a case that the branching tap 1201 writes data received from a device into a memory area.

When the microprocessor employed in the branching tap 1201 receives data from a device via a connect port (step S1701), this microprocessor checks as to whether or not the device connected to the connect port is multiplexed with reference to the connect port management table 1400 (step S1702). In other words, the microprocessor checks as to whether or not the same position ID as the position ID of the connect port number corresponding to the connect port is present in the connect port management table 1400. As a result of this checking, in such a case that the connect port is not multiplexed ("N" at step S1702), the received data is overwritten into the memory area 1210 which is allocated to the connect port (step S1703).

On the other hand, when the connect port is multiplexed ("Y" at step S1702), the microprocessor retrieves a minimum connect port number from the connect port numbers to which the same position ID is set (step S1704), and overwrites the data into the memory area 1210 which is allocated to a connect port corresponding to the retrieved minimum connect port number (step S1705).

The branching tap 1201 periodically transmits the data which is overwritten into the memory area 1210 in accordance with the above-described process flow operation shown in FIG. 16 via the network 1200 to another intelligent device and the like.

Figure 17:
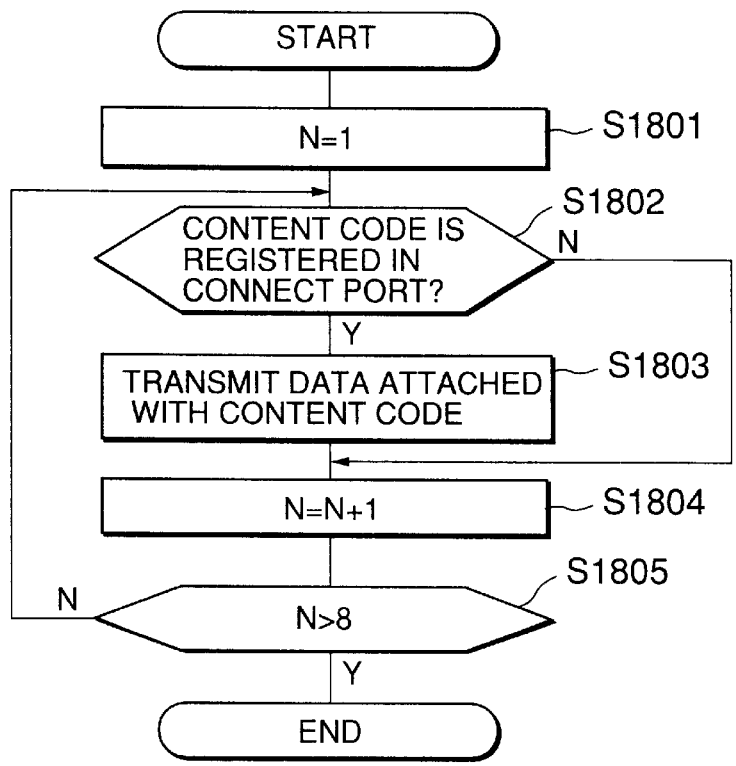
FIG. 17 is a flow chart for describing a process operation in the case that the branching tap 1201 transmits data written into a memory area 1210 via a network 1200.

FIG. 17 is a flow chart for explaining process operations executed in such a case that the branching tap 1201 transmits the data written in the memory area 1210 to the network 1200. It should be noted that the process operations shown in FIG. 17 are executed by the microprocessor employed in the branching tap 1201 in a periodic manner, for example every 100 milliseconds.

First, an initial value (=1) is set with respect to a variable "N" (step S1801), and a data transmission operation is commenced from data of a memory area 1 which is allocated to a connect port "A". First, the microprocess provided in the branching tap 1201 searches the content code management table 1600 and then checks as to whether or not a content code is registered in a memory area number "N" (step S1802). As a result, in the case that the content code is not registered in the content code column 1602 ("N" at step S1802), since the memory area "N" is not used, the microprocessor adds "1" to the variable "N" in order to advance to a data transmission process operation of a next memory area (step S1804).

On the other hand, in the case that the content code is registered in the memory area number "N" ("Y" at step S1802), the microprocessor reads out the data stored in this memory area N, and then broadcasts a message which has the content code corresponding to the memory area number "N" in the content code management table 1600 to the network 1200 (Step S1803). The broadcasted message is received by an intelligent device and a computer so as to be processed, which require the message.

When the message transmission is completed, the microprocessor adds "1" to the variable "N" in order to advance to a data transmission process operation of a next memory area (step S1804). Then, the microprocess judges as to whether or not the variable "N" is larger than 8, namely whether or not the data transmission operation has been carried out as to all of the memory areas (step S1805). As a result of this judgment, when the data transmission operation has been completed as to all of the memory areas ("Y" at step S1805), the process operation is ended. On the other hand, when there is still such a memory area from which the data has not yet been transmitted ("N" at step S1805), the process operation is advanced to the data transmission operation with respect to the next memory area.

In accordance with this third embodiment, the sevices to be cooperated with each other can be set by merely changing the setting of the dip switch provided in the branching tap, and furthermore, the devices can be multiplexed without changing the program and also without requiring the complex setting change. In the conventional distributed processing system, the dedicated hardware to the multiplexing and also the specific setting operation are necessarily required in order to multiplex the devices. On the contrary, in the distributed processing system of the third embodiment, only the dip switch is set in order to multiplex the devices where the malfunction frequently occurs. Therefore, the workloads given to the programmer and the operator can be largely reduced. Also, since no complex process operation is required, the multiplex setting operation of the devices can be carried out by any of non-expertised persons, and the working time required to change the distributed processing system can be greatly reduced.

The third embodiment represents such a method that the cooperation of the devices connected to the branching tap is set by using the dip switch so as to multiplex an arbitrary device. This multiplexing method may be advantageously utilized in such a case that in an intelligent block I/O equipped with a plurality of I/O modules, the I/O modules are multiplexed.

Figure 18:
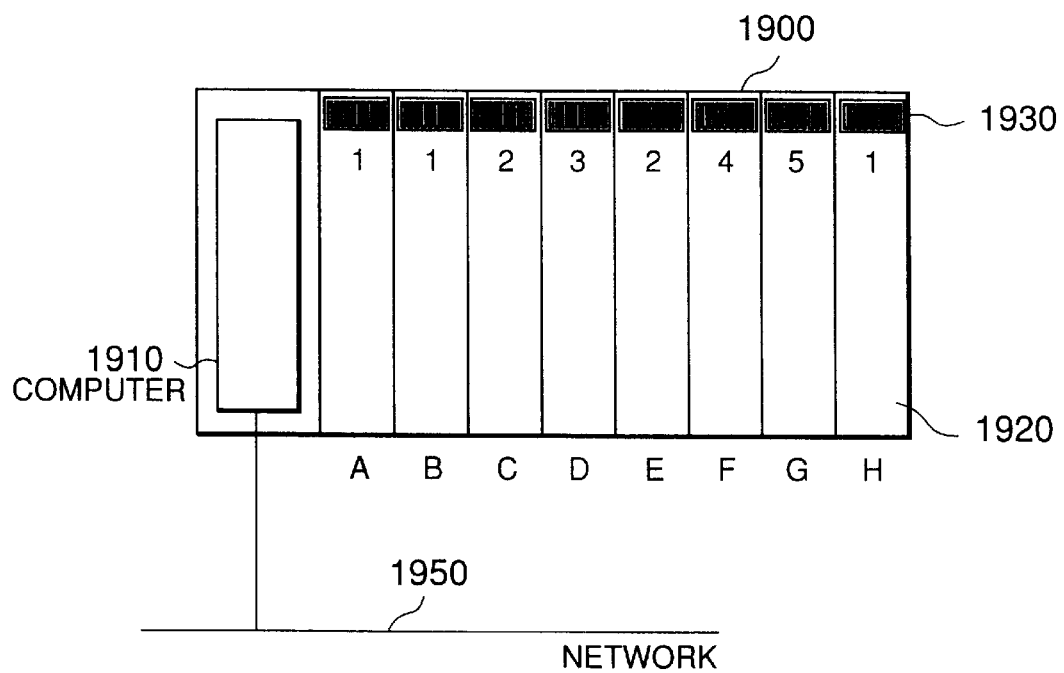
FIG. 18 is an illustration of a structural example of an intelligent block I/O.

FIG. 18 illustratively shows a structural example of an intelligent block I/O. As shown in FIG. 18, an intelligent block I/O 1900 comprises a computer 1910 and 8 sheets of I/O modules 1920. The computer 1910 is connected via an internal bus to 8 sheets of I/O modules 1920. As indicated in FIG. 18, these eight I/O modules 1920 are named by using symbol "A" to symbol "H", respectively. Also, a dip switch 1930 is provided with each of these I/O modules 1920. The position IDs of the respective I/O modules 1920 are set by manipulating these dip switches 1930. In the example of FIG. 18, the position IDs of the I/O modules "A", "B", and "H" are set to "1"; the position IDs of the I/O modules "C" and "E" are set to "2"; the position ID of the I/O module "D" is set to "3"; the position ID of the I/O modules "F" is set to "4"; and the position ID of the I/O modules "G" is set to "5".

16 sets of devices can be connected to each of these I/O modules 1920 at maximum. In other words, 128 sets of devices can be connected to the intelligent block I/O 1900 at maximum. The computer 1910 processes data received from the respective I/O modules 1920, and then transmits the processed data to the network 1900. In this example, the data received from each of the I/O modules 1920 is 2 bytes (namely 16 bits).

FIG. 19 is a diagram for schematically showing an internal structure of the intelligent block I/O according to the present invention. As shown in FIG. 19, each of I/O modules 2010 transmits a message 2030 via an internal bus 2020 to a computer 2060. The message 2030 is constituted by a position ID 2031 and input data 2032. This position ID 2031 is set by a dip switch mounted on each of these I/O modules 2010. The input data 2032 is supplied from a device connected to an I/O module. The message 2030 sent from the I/O module 2010 is received via an bus interface by a microprocessor 2061 employed in the computer 2060. A memory area 2062 for storing data received from each of the I/O modules 2010 is provided in the computer 2060. The memory area 2062 is constituted by 8 memory areas which are used to store data received from 8 sheets of I/O modules 2010. In this example, a dimension (capacity) of each memory area is 2 bytes, and a dimension (capacity) of the entire memory area 2062 is 16 bytes. The data which are overwritten into the respective memory areas are periodically transmitted to the network 2050.

The computer 2060 employed in the intelligent block I/O 2000 holds a position ID management table for managing a relationship between a position ID and a memory area. FIG. 20 is a diagram for representing a structural example of a position ID management table 2100. As shown in FIG. 20, this position ID management table 2100 is constructed of a position ID column 2101 and a memory area number column 2102. The data in the position ID management table 2100 is set by an operator, for example, via a network 2050 from another computer and the like.

Figure 21:
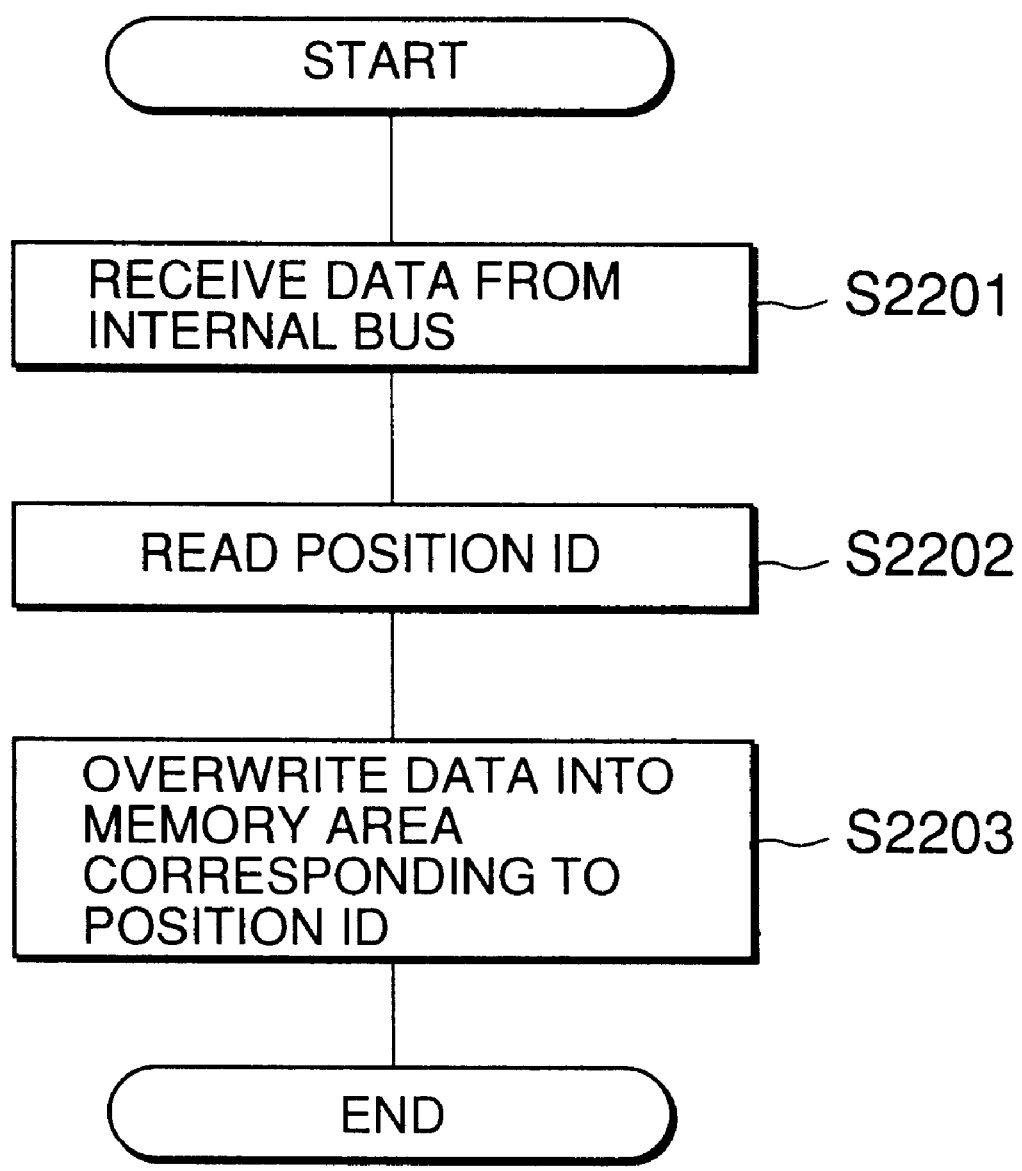
FIG. 21 is a flow chart for describing process operations executed in the intelligent block I/O.

FIG. 21 is a flow chart for describing a process operation executed in the computer 2060 provided in the intelligent block I/O 2000. Upon receipt of the message 2030 via the internal bus 2020 (step S2201), the computer 2060 reads out a position ID 2031 contained in the message (step S2202). Then, the computer 2060 retrieves a memory area number corresponding to the read position ID from the position ID management table 2100, and overwrites the received data 2030 into the corresponding memory area 2062 (step S2203). For example, when the message 2030 to which the position ID="1" is attached is received via the internal bus 2020, the computer 2060 retrieves a memory area number corresponding to the position ID="1" from the position ID management table 2100. In the example shown in FIG. 20, the memory area number corresponding to the position ID="1" is "1". As a result, the data 2032 contained in the message 2030 is stored into the memory area 1 corresponding to the memory area number "1".

The data stored in the memory area 2062 is transmitted to the network 2050 in a similar manner to the above-explained manner shown in FIG. 17. Thus, the content codes are applied to the data stored in the respective memory areas, and then the resultant data are periodically sent to the network 2050. The transmission process operation is not carried out as to such a memory area into which the data 2032 received from the internal bus is not stored.

As previously described, in accordance with this embodiment, an arbitrary I/O module of the intelligent block I/O can be multiplexed by merely changing the setting of the dip switch. Other intelligent devices and computers which receive the message sent from this intelligent block I/O, need not pay an attention to such a fact that the I/O modules are multiplexed. For instance, even when the duplicated I/O modules are multiplexed in a tripled manner, neither the program is changed, nor the setting condition is changed. In the conventional distributed processing system, the hardware specifically used to multiplex the I/O modules and also the specific setting operation are necessarily required in order to multiplex these I/O modules. On the contrary, in the distributed processing system of the embodiment, only the dip switch is set in order to multiplex the I/O modules, and the workloads given to the programmer and the operator can be largely reduced.

While the present invention has been described in detail, in the distributed processing system according to the present invention, the setting places of the intelligent devices can be moved, or, the intelligent devices can be multiplexed, without changing the setting values and the programs. As a consequence, the workloads given to the programmers who configure/alter the distributed processing system, and the workloads given to the workers in the field can be considerably reduced. Moreover, the distributed processing system can be readily increased/changed even by any of non-expertised engineers.

What is claimed is:

1. A distributed processing system for executing a series of processing operations by a plurality of computers connected to a network comprising:

at least one computer among said plurality of computers comprising:

means for seeking another computer when a place where said computer is set is changed and when said computer is connected to the network, said means for seeking another computer comprising means for transmitting positional information to another computer, said positional information indicating a place where said computer is set; and means for enabling said at least one computer to read necessary data from said another computer, said at least one computer changing its setting condition based upon the read data to execute a processing operation; and said another computer for receiving said positional information, said another computer comprising:

means for comparing the received positional information with positional information about a place where the another computer is set; and means for sending a response in the case that said received positional information is coincident with said positional information about the place where the another computer is set.

2. An intelligent device used in a distributed processing system for executing a series of processing operations by a plurality of intelligent devices connected to a network, said intelligent device comprising:

means for seeking another intelligent device when a place where the own intelligent device is set is changed and when said intelligent device is connected to the network; and means which enables for said intelligent device to read necessary data from said another intelligent device; said intelligent device changing its setting condition based upon the read data to execute the processing operation;

positional information managing means for managing positional information related to a past setting place and positional information related to a present setting place; and means for judging as to whether or not the place where the intelligent device is set is changed with reference to said positional information managing means.

3. A cooperating method of a distributing processing system for executing a series of processing operations by a plurality of computers connected to a network, comprising:

seeking another computer by a first computer when a place where the first computer is set is changed and connected to the network, said seeking another computer comprising:

registering positional information indicative of a place where a computer is set;

transmitting the registered positional information;

receiving the transmitted positional information by another computer;

comparing said received positional information with positional information indicative of a place where the own computer is set;

transmitting a response in such a case that said received positional information is coincident with the positional information indicative of the place where the own computer is set; and receiving said response by the computer which has firstly transmitted the positional information; and said first computer reading out necessary data from said another computer; and said first computer whose setting place is changed changing its setting condition based upon the read data to execute the process operation.

4. A cooperating method as claimed in claim 3, further comprising:

a step for managing positional information related to a place where a computer is presently set and positional information related to a place where said computer was set in the past, and for comparing the past positional information with the present positional information, whereby a judgment is made as to whether or not the setting place of said computer is changed.

* * * * *